T. RICHARDSON.
LUBRICATOR FOR HANDSAWS.
APPLICATION FILED FEB. 20, 1912.
1,055,080.
Patented Mar. 4, 1913.
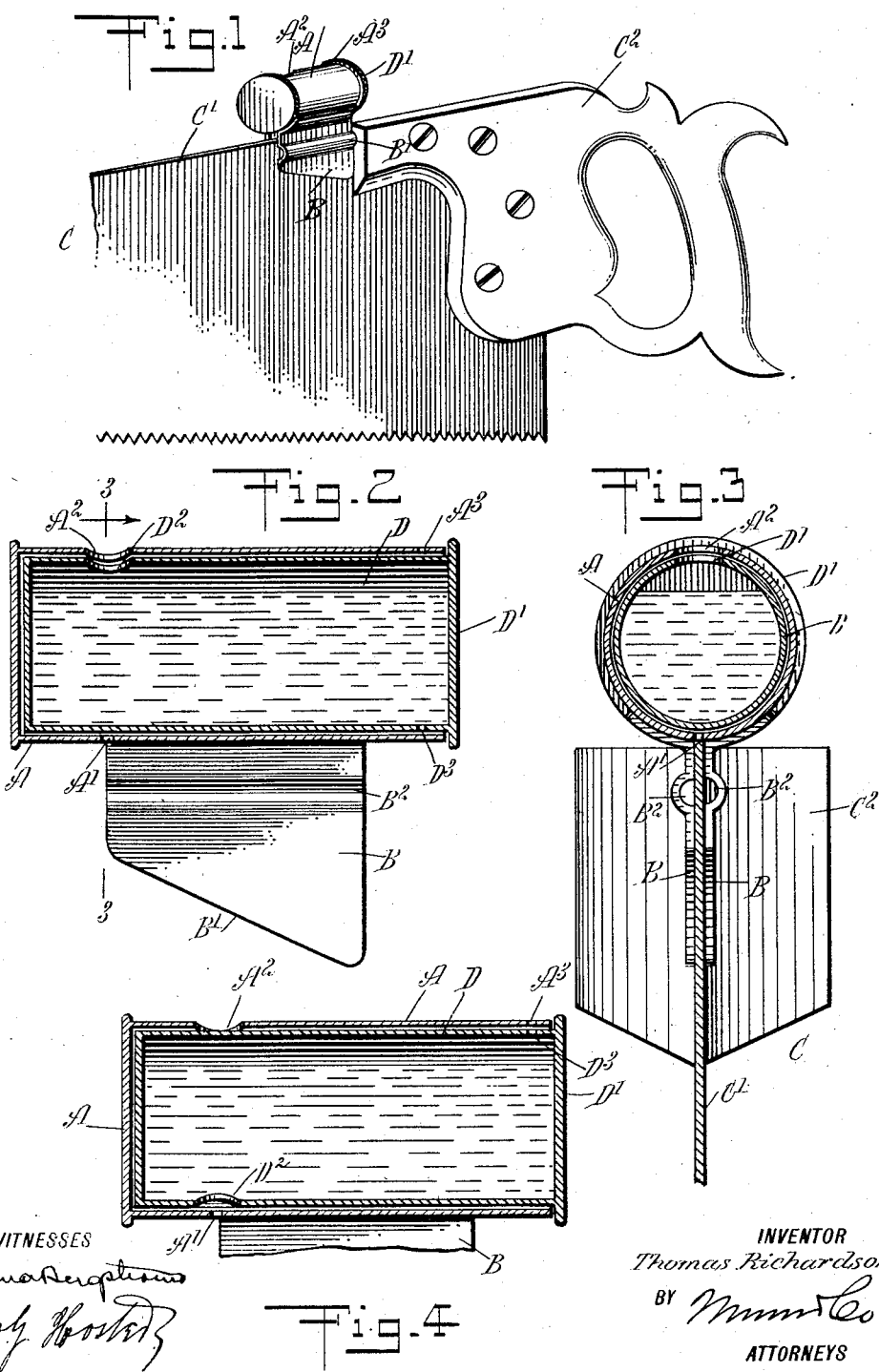
WITNESSES
INVENTOR
Thomas Richardson
BY
ATTORNEYS

UNITED STATES PATENT OFFICE.

THOMAS RICHARDSON, OF NEW ORLEANS, LOUISIANA, ASSIGNOR OF ONE-HALF TO ANNE E. FORD, OF NEW ORLEANS, LOUISIANA.

LUBRICATOR FOR HANDSAWS.

1,055,080.            Specification of Letters Patent.        Patented Mar. 4, 1913.

Application filed February 20, 1912. Serial No. 678,826.

*To all whom it may concern:*

Be it known that I, THOMAS RICHARDSON, a citizen of the United States, and a resident of New Orleans, in the parish of Orleans and State of Louisiana, have invented a new and Improved Lubricator for Handsaws, of which the following is a full, clear, and exact description.

The object of the invention is to provide a new and improved lubricator and oil cup for hand-saws and similar tools, and arranged to insure proper oiling of the saw blade and to allow convenient and quick attachment of the lubricator to the saw blade or to allow removal therefrom.

For the purpose mentioned, use is made of a casing provided with clamping members adapted to straddle and clamp a saw blade, the casing having an outlet at the bottom and a filling opening at the top, and an oil container revoluble in the said casing and provided with an opening adapted to register when in one position with the said filling opening, and when in another position with the said outlet.

A practical embodiment of the invention is represented in the accompanying drawings forming a part of this specification, in which similar characters of reference indicate corresponding parts in all the views.

Figure 1 is a perspective view of the lubricator as applied to a hand-saw; Fig. 2 is an enlarged longitudinal central section of the lubricator with the container in filling position; Fig. 3 is a transverse section of the same on the line 3—3 of Fig. 2 as applied to a hand-saw; and Fig. 4 is a longitudinal central section of the lubricator with the container in discharge position.

The tubular casing A is provided with depending clamping members B, B adapted to engage the opposite faces of the saw blade C' of a hand-saw C provided with the usual handle $C^2$, against the forward end of which abut the rear ends of the clamping members B, B, as plainly shown in Fig. 1. The casing A is provided at the bottom intermediate the clamping members B, B and at the forward ends thereof with an outlet opening A', and on top of the casing A directly above the outlet opening A' is arranged a filling opening $A^2$.

Within the casing A is fitted a tubular container D closed at both ends and having the rear end provided with a rim D' adapted to abut against the rear open end of the casing A, which latter is preferably closed at the forward end, as plainly indicated in Figs. 1, 2 and 4. The container D is adapted to contain oil or other lubricant and is provided with an opening $D^2$ adapted to register with the filling opening $A^2$ at the time the container D is in the position shown in Fig. 2, and the said opening $D^2$ is adapted to register with the outlet opening A' at the time the container D has been given a half turn, as shown in Fig. 4. The casing A is provided near the rear end with a vent opening $A^3$ adapted to register with a like opening $D^3$ formed near the rear end of the container D, the said vent openings $D^3$ and $A^3$ being in register with each other at the time the container D is in the position shown in Fig. 4, that is, at the time the opening $D^2$ is in register with the outlet opening A'.

When the several parts are in the position shown in Fig. 2, the lubricant is cut off from the saw blade C' and the container D can be readily filled with lubricant through the registering openings $A^2$, $D^2$. When it is desired to lubricate the saw blade C' the operator gives a half turn to the container D to move the latter into the position shown in Fig. 4, whereby the opening $D^2$ is moved into register with the opening A' to allow the lubricant to flow from the container D through the registering openings $D^2$ and A' onto the saw blade C' and down the forward edges of the clamping members B, B, the lower ends B' of which are beveled to allow the lubricant to flow down the same and onto the saw blade C', thus distributing the lubricant on both faces of the saw blade. When the container D is in discharge position as shown in Fig. 4, the vent openings $D^3$ and $A^3$ are in register with each other and consequently a free flow of the lubricant through the registering openings $D^2$ and A' is had, and when it is desired to cut off the flow of oil it is only necessary to turn the container D until the opening $D^2$ is out of register with the opening A'.

The clamping members B, B are preferably provided at the inner faces with longitudinal recesses $B^2$ forming a reservoir for retaining the oil and gradually distributing the same to the saw blade.

The lubricator and oil cup shown and described is very simple and composed of few parts, not liable easily to get out of order, and the said lubricator can be readily filled with oil or other liquid lubricant and placed in position on the saw blade or removed therefrom whenever it is desired to do so.

Having thus described my invention, I claim as new and desire to secure by Letters Patent:

1. A lubricator for hand-saws, comprising a tubular casing closed at one end and open at the other end, clamping members on the said casing for engagement with the opposite faces of the saw blade to hold the casing on the blade by the frictional contact of the members with said blade, the said clamping members being provided at their inner faces with oil-lubricating recesses extending lengthwise of the clamping members, and a tubular container mounted to turn in the said casing and closed at its ends, one of the ends being outside the open end of the casing to permit of turning the container in the casing, the latter being provided at the top with a filling hole and with a vent hole and at the bottom with a discharge opening intermediate the said clamping members and at the forward ends thereof, and the said container being provided with an outlet port adapted to register with the said discharge opening and with the said filling hole, and the said container being provided with a vent hole adapted to register with the vent hole in the said casing at the time the outlet port is in register with the said outlet opening.

2. A lubricator for saws, comprising a tubular casing open at one end and closed at the other end and provided on its under side with downwardly projecting and spaced clamping members for engagement with opposite faces of a saw blade to hold the casing on the blade by frictional contact of the said members with the said blade, the clamping members having recesses on their inner faces for distributing the lubricant on the saw blade, said casing having a filling opening and a vent opening in its top and a discharge opening in the bottom intermediate of the clamping members, and a tubular container having closed ends and mounted to turn in the casing and provided with an opening adapted to register with either the filling or discharge opening of the casing and with a vent opening adapted to register with the vent opening of the said casing.

In testimony whereof I have signed my name to this specification in the presence of two subscribing witnesses.

THOMAS RICHARDSON.

Witnesses:
   ALEXANDER PETER LAURENT,
   HILLEY MARSH.

---

Copies of this patent may be obtained for five cents each, by addressing the "Commissioner of Patents, Washington, D. C."